Jan. 11, 1966  J. SAMUEL ETAL  3,229,286
FM CW DISTANCE MEASURING SYSTEM
Filed Jan. 28, 1963  2 Sheets-Sheet 2

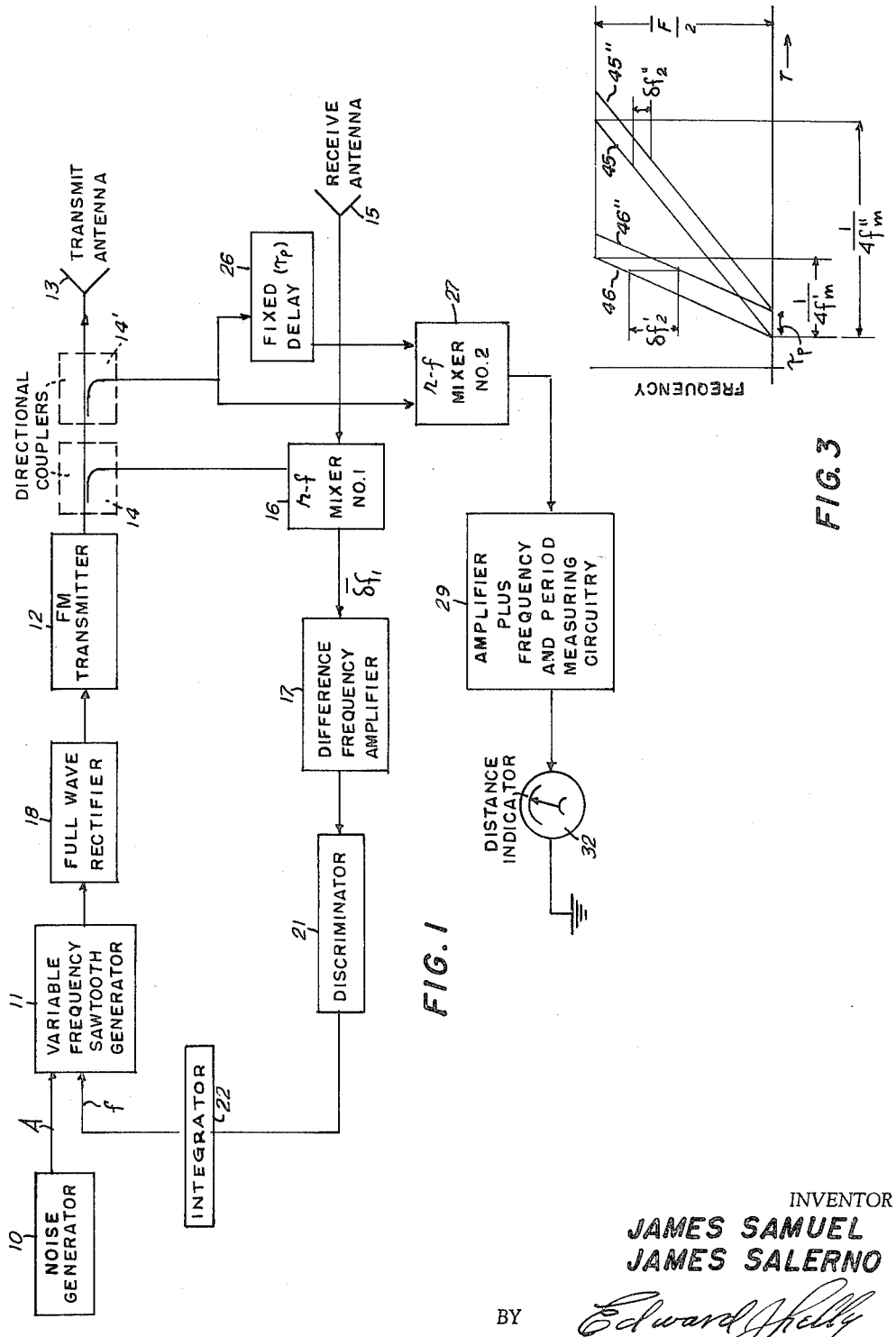

INVENTOR
*JAMES SAMUEL
JAMES SALERNO*

BY *Edward Kelly*

ATTORNEY

United States Patent Office 3,229,286
Patented Jan. 11, 1966

3,229,286
FM CW DISTANCE MEASURING SYSTEM
James Samuel, Washington, D.C., and James Salerno, Rockville, Md., assignors to the United States of America as represented by the Secretary of the Army
Filed Jan. 28, 1963, Ser. No. 254,522
2 Claims. (Cl. 343—14)
(Granted under Title 35, U.S. Code (1952), sec. 266)

The invention described herein may be manufactured and used by or for the Government of the United States of America for governmental purposes without the payment to me of any royalty thereon.

This invention relates to the field of radar distance measuring systems and more particularly to frequency modulated, continuous wave range tracking systems.

The field of radar distance measuring includes one class of devices which employ a continuous wave, frequency modulated signal. In such devices, the signal is modulated according to some arbitrary function of time, such as a sine wave or a triangular wave; it is then radiated in the direction of potential targets, reflected from these targets, and a portion of it is received by a receiver associated with the device. Because of the finite time interval required for an electromagnetic wave to pass from a transmittter to a target and back to the transmitter, the instantaneous frequency of the received signal will differ from that of the simultaneously occurring transmitter signal. This frequency difference is measured in the distance measuring device, and if the transmitter modulating function is known, the difference frequency will provide an indication of the target distance. Devices of this class are exemplified by the structures shown in Patent No. 2,537,593, issued on Jan. 9, 1951, to V. D. Landon et al., and 2,928,085 issued on March 8, 1960, to A. J. Katz. Both of these devices vary the modulating function in order to maintain a constant difference frequency between the simultaneously occurring segments of the transmitted signal and the received signal, and measure the repetition rate of the modulating signal in order to obtain an indication of target distance. The accuracy of these devices is dependent on their ability to maintain the peak-to-peak deviation of the modulating function wave form at a constant value for if this deviation changes, the repetition rate of the modulating signal will not accurately represent the target distance. This result is due to the fact that the frequency difference between the transmitted signal and the received signal is actually dependent on the rate of change of frequency, or the frequency vs. time slope, of the transmitter signal. When the peak-to-peak deviation of that function remains constant, its repetition rate is indicative of target distance, but when the deviation changes, the repetition rate must change so that the slope of the modulating signal will remain constant.

It is therefore an object of this invention to provide a measurement of the rate of change of frequency of the transitter signal in a system which maintains a constant difference frequency between the transmitted signal and the received signal.

It is another object of this invention to provide a radar distance measuring device whose accuracy is independent of fluctuations in the frequency deviation of the frequency modulated signal.

These and other objects will become apparent from the following description of the present invention taken together with the drawings, in which:

FIG. 1 is a block diagram of a preferred embodiment of this invention.

FIGS. 2 and 3 are graphs of the wave forms of signals appearing at various points in the circuit of FIG. 1.

Figure 2A:
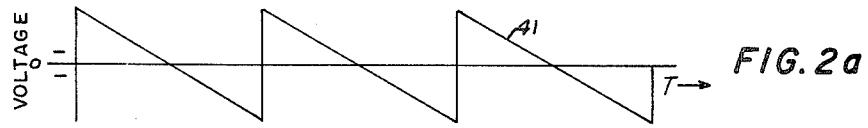

Turning now to FIG. 1, there is shown a block diagram of a preferred embodiment of this invention. In this circuit a random signal, or "noise," generator 10 supplies one input to a variable frequency sawtooth generator 11. This input to the generator 11 functions to give a small amount of random variation to the peak-to-peak amplitude of the output of the generator 11. The generator 11 is adjusted so that the output is approximately centered at zero volts. This output is conducted to the input of a full wave rectifier 18 in order to change the sawtooth wave train to a triangular wave train. The output of rectifier 18 will therefore be a wave having a series of alternating positive and negative slopes, with both legs of each triangle having the same rate of change so that the signal appearing at the output of rectifier 18 has a constant instantaneous rate of change (except at the turn-around points). This triangular wave is used to modulate a frequency modulated transmitter 12. The output of this transmitter will therefore be a continuous wave having a frequency which varies in direct proportion to the amplitude of the output of the rectifier 18. The output of transmitter 12 is conducted to a radiating antenna 13 and a pair of directional couplers 14 and 14'. The directional coupler 14 serves to conduct a portion of the transmitted signal to one input of a mixer 16. The other input to the mixer 16 represents reflections of the transmitted signal from some target object, which reflections are received by antenna 15. Therefore, the signal received by antenna 15 will have the same frequency variation pattern as that produced in transmitter 12, but the received signal pattern will be delayed from the transmitted signal by a time interval which is equal to the transit time of signals traveling from the transmitting antenna 13 to a target object and back to receiving antenna 15. The transmitted and received signals are combined in mixer 16, the output of which has a signal component having a frequency equal to the instantaneous difference to the frequencies of the input signals. This component is conducted to difference frequency amplifier 17, where it is amplified and conducted to a frequency responsive discriminator 21. The output of discriminator 21 will therefore be a voltage which has an amplitude proportional to the difference frequency component of the output of the mixer 16. The discriminator 21 is adjusted so as to have a zero voltage output when the frequency of the difference frequency component of the output of mixer 16 is at a preselected value. When the frequency of this component rises above this value, the output of discriminator 21 will increase in a negative direction and when the frequency of the component falls below the preselected value the output of discriminator 21 will increase in a positive direction. The discriminator output is therefore a type of error signal which is zero when the desired frequency difference exists between the transmitted and received signals and which has a finite value when this frequency difference departs from the desired value. The output of discriminator 21 is connected to a storage device 22 which could be some form of electronic integrator consisting of a high gain amplifier having a capacitor on its output. The output of this storage device is connected to the frequency control input 23 of the sawtooth generator 11. Thus, the output of discriminator 21 serves to maintain the modulating frequency produced by the sawtooth generator 11 at that value which will cause the difference between the instantaneous output frequency of transmitter 12 and the instantaneous frequency of the reflected signal received by antenna 15 to be maintained at a predetermined value.

It should be noted that if the discriminator 21 can be designed to have a sufficiently wide bandwidth, it will bring the repetition rate of the generator 11 to the proper value without the need for any external frequency sweeping circuitry. If it is desired that the discriminator have a narrower bandwidth, then it would be necessary to include a frequency sweeping circuit which would be connected to the input 23 of sawtooth generator 11. This frequency sweeping circuit would have the effect of varying the repetition rate, and hence the slope, of the output of sawtooth generator 11 until that generator produces a signal having the proper slope to produce the desired difference frequency output $\delta f_1$ at mixer 16. The system would be adapted to function so that when this difference frequency signal is achieved the automatic sweep of the generator 23 is terminated and the output of discriminator 21 would be employed as the sole means for controlling the frequency of the generator 11. Such a system is disclosed in the Hardinger et al. patent, infra.

As will be explained in greater detail infra, the effect of maintaining this difference frequency constant is that the rate of change of frequency of the transmitter output 12, or the slope of any portion of the triangular wave output of rectifier 18, will be inversely proportional to the distance from the antennas of the distance measuring system to the reflecting surface or target object. This relation is utilized in the distance measuring system of the device of FIG. 1. The distance measurement is achieved by diverting a portion of the transmitted signal at directional coupler 14′, and conducting this signal portion to both the input of a fixed delay device 26 and one input of a difference frequency mixer 27. The signal applied to the input of circuit 26 is delayed by a fixed time interval and the delayed signal is applied as the second input to mixer 27. The output of mixer 27 contains a signal component having a frequency equal to the difference in frequency between the two inputs to mixer 27. This output is connected to a difference frequency amplifier and frequency measuring circuit 29, the output of which is applied to a direct reading meter 31. The face of the meter 31 is calibrated in units of distance to provide a direct indication of the distance of the reflecting surface from the measuring system.

The circuits shown in block form in FIG. 1 are all well-known devices and will not be described in detail. It would seem sufficient to say, that, given the teaching of this specification, it would be within the skill of one in the art to select the proper units to construct a workable system. The noise generator 10 and sawtooth generator 11 of FIG. 1, could be of the type shown in the pending application of Hardinger, et al., Serial No. 48,786, filed Aug. 10, 1960, now U.S. Patent No. 3,109,172, for a Low Altitude FM Altimeter. The noise generator and phantastron of FIG. 5 of the Hardinger et al. patent could be modified so as to provide a variable frequency output, as is required in the present invention, by the use of a variable resistor or variable capacitor in the feedback circuit of the pentode 32 of the phantastron modulator 11. A variable resistance could be provided, for example, by placing a vacuum tube in the feedback circuit and varying the input to that tube, so that the tube plate resistance is varied. The input to the grid of that tube would then be supplied at the terminal 23 of FIG. 1 of the present application. Many other methods of varying the repetition frequency of the modulator 11 would occur to one skilled in the art, such as the provision of a mechanically varied resistor or capacitor in the feedback circuit which component could be controlled by the output of a motor. The motor could be in integrator 22. Thus, any type of electronic or electromechanical link could be provided between the output of discriminator 21 and the input 23 of the variable frequency modulator 11.

The operation of the device of FIG. 1 will now be explained in connection with FIGS. 2 and 3 which show graphs of various signals present in the circuit of FIG. 1. These graphs will also be used to indicate the precise difference between the measuring technique of this invention and the techniques used in similar prior art range measuring systems. Referring now to FIG. 2a, there is shown a curve representing voltage vs. time for the output of modulator 11. It will be noted that this output is adjusted so that its maximum and minimum values are approximately symmetrically spaced about the zero voltage axis. Such a voltage distribution could be obtained in a circuit similar to that of FIG. 5 of the Hardinger et al. application by the addition of a bias voltage at the output, or by placing the circuit ground at some intermediate point on the output resistor rather than at the place shown in that figure. Many other techniques for producing such a signal would occur to one skilled in the art.

Figure 2B:
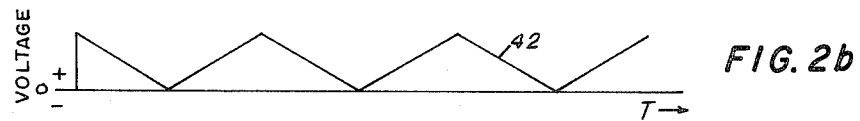
Figure 2C:
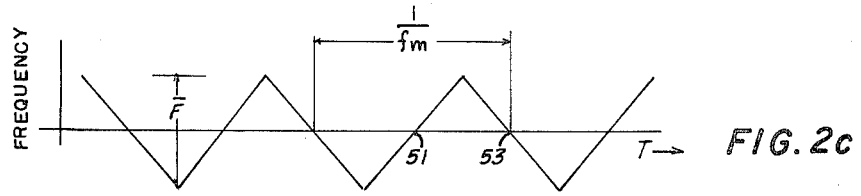

It should also be noted that the excursions of the sawtooth wave output of generator 11 vary in a random manner from cycle to cycle. This is caused by the signal from the random noise generator 10. This variation from cycle to cycle causes the output of mixer 16 to have a diffused difference frequency spectrum, which would not be the case if there were no random amplitude variation present at the output of modulator 11. This phenomenon is discussed fully in the above-mentioned Hardinger et al. patent. The output of the full wave rectifier 18 is shown in FIG. 2b. It may be observed that the result of the inversion of the negative portions of the sawtooth wave of FIG. 2a is a triangular wave having a constant magnitude, alternating polarity slope. The output of the rectifier 18 is applied to the input of transmitter 12. This transmitter could be of any type which is adapted to produce an output signal, the frequency of which varies in accordance with the input signal voltage. A voltage-tunable magnetron is well suited for such an application. The change in the frequency of the output of transmitter 12 with respect to time is shown in FIG. 2c. It may be seen from this figure that the instantaneous frequency produced at the output of the transmitter 12 is directly proportional to the voltage appearing at the output of rectifier 18. Therefore, the frequency of the output of transmitter 12 varies linearly with time over its frequency deviation range $\overline{F}$, where $\overline{F}$ represents the average frequency deviation.

Figure 2D:
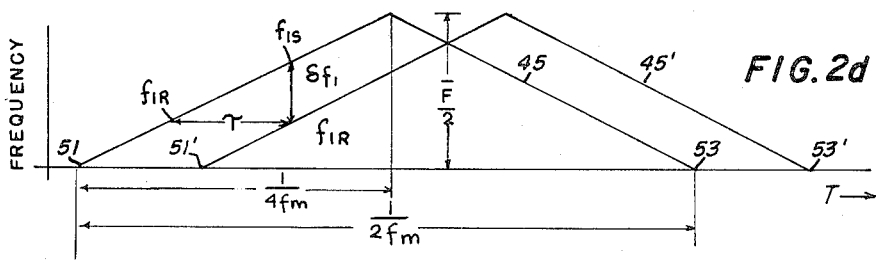

FIG. 2d shows the frequency vs. time characteristic for a portion 45 of the wave of FIG. 2c on an expanded timescale. The wave 45′ represents the frequency vs. time characteristic for the reflected signal received at antenna 15. Because of the finite velocity of electromagnetic waves, there is a time delay $\tau$ between the radiation of the output of transmitter 12 and the reception of the reflection thereof. This delay is directly proportional to the distance separating the system of FIG. 1 from the reflecting surface. Because of this delay there is an instantaneous frequency difference $\delta f_1$ existing between the transmitted signal and the reflected signal. With the help of FIG. 2d it is possible to derive an expression for the relation between this difference frequency and the time delay $\tau$. An inspection of FIG. 2d reveals that the following proportionality exists:

$$\frac{\overline{\delta f_1}}{\tau} = \frac{\overline{F}/2}{1/4f_\mathrm{m}} \qquad (1)$$

where $f_\mathrm{m}$ equals the average modulation frequency of the transmitter 12, and $\overline{\delta f_1}$ equals the average difference frequency. Simplifying Equation 1 yields:

$$\overline{\delta f_1} = 2\tau \overline{F} f_\mathrm{m} \qquad (2)$$

Since the velocity of the electromagnetic wave is $c$, the delay time $\tau$ may be expressed as:

$$\tau = \frac{2D}{c} \qquad (3)$$

where $D$ equals the distance from the range measuring system to the reflecting surface. Substituting this value for $\tau$ into Equation 2 yields:

$$\overline{\delta f_1} = \frac{4D\overline{F}f_\mathrm{m}}{c} \qquad (4)$$

Figure 2E:
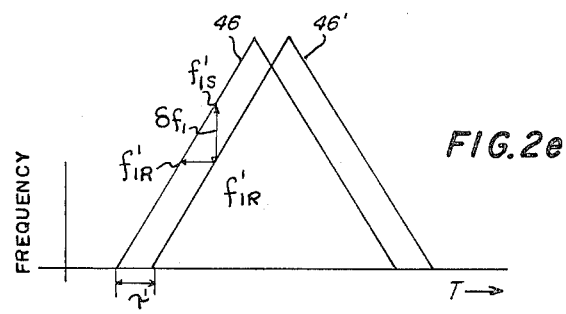

Thus it may be seen that the frequency of the output of mixer 16 is directly proportional to both the distance $D$ between the measuring system and the reflecting surface and the modulating frequency $f_\mathrm{m}$ produced by the rectifier 18. Since the circuitry 17, 21 and 22 serves to vary the modulating frequency $f_m$ so as to maintain the difference frequency $\overline{\delta f_1}$ of the output of mixer 16 constant, it is obvious that the product of frequency deviation $\overline{F}$ and modulating frequency $f_m$, which product represents the slope of the output of rectifier 18, will be maintained at a value inversely proportional to the distance D. If the distance D represented by the time delay shown in FIG. 2d is decreased, the transmitted and reflected waves will be separated by a new distance $$\frac{c\tau'}{-2}$$

as shown in FIG. 2e. Since these two waves are closer together in time, and since the feedback circuitry to modulator 11 serves to maintain the difference frequency of the output of mixer 16 at a constant value, the effect of the smaller time delay will be to increase the modulating frequency produced by the modulator 11, or to increase the slope of the modulating wave form 46.

Having thus described the manner in which the slope of the modulating wave form varies with changes in target distance, the operation of the measuring circuit consisting of elements 26, 27, 29 and 31 will now be described in connection with FIG. 3.

A portion of the transmitted signal 12 is conducted by coupler 14' to fixed delay device 26 and to mixer 27. The output of delay device 26 constitutes the other input to mixer 27. The difference frequency output $\delta f_2$ from mixer 27 may be expressed in the form of Equation 2. Thus, the difference frequency output of mixer 27 is equal to:

$$\delta f_2 = 2\tau_p \overline{F} f_m \qquad (5)$$

where $\tau_p$ represents the fixed delay provided by circuit 26. Equation 4 may be rearranged in the following manner:

$$f_m = \frac{\overline{\delta f_1} c}{4 D \overline{F}} \qquad (6)$$

Substitution of Equation 6 into Equation 5 yields:

$$\delta f_2 = \frac{2\tau_p \overline{F} \overline{\delta f_1} c}{4 D \overline{F}} = \frac{\tau_p \overline{\delta f_1} c}{2 D} \qquad (7)$$

This equation reveals that the difference frequency $\delta f_2$ is inversely proportional to the distance separating the measuring system from the reflecting surface, and is independent of both the frequency deviation $\overline{F}$ of the transmitted signal and any nonlinearity of response of the transmitted signal frequency to $f_m$. Thus, by using the distance measuring system of this invention, errors due to variations in the frequency deviation of transmitter 12 are eliminated. This result, in addition to being mathematically demonstrable, as has been done above, should be obvious from an examination of FIGS. 2d and 3. From FIG. 2d it is obvious that the difference frequency $\overline{\delta f_1}$ produced at the output of mixer 16 is almost entirely due to the vertical separation between the waves 45 and 45', and is independent of the frequency deviation $\overline{F}$ produced by the transmitter 12. Thus, the feedback system 17, 21 and 22 of FIG. 1 serves to maintain the slope of the frequency variation curve 45 at a desired value rather than attempting to maintain the frequency deviation $\overline{F}$ at some desired value. Turning now to FIG. 3 where the line 45 represents a portion of the transmitted signal frequency characteristic when the target is at a distance which would correspond to the slope of the wave form of FIG. 2d, and the line 45'' represents the same signal after having been delayed by the fixed delayed device 26, it is readily seen that the frequency difference $\delta f''_2$ is completely dependent on the slope of the frequency characteristic rather than on the modulating frequency $f_m$ or the frequency deviation $\overline{F}$ of the transmitter 12. The lines 46 and 46'' of FIG. 3 represent the frequency characteristic of the transmitted wave and the output of the delay device 26, respectively, for a target distance which would produce the waves of FIG. 2e. It may be observed that since the same delay is used for both of the variable frequency transmissions represented in FIG. 3, the frequency difference $\delta f'_2$ is greater than the frequency difference $\delta f''_2$. This indicates that as distance decreases the difference output of mixer 27 proportionally increases. Thus it may be seen that this difference frequency output represents a true measure of the distance of the reflecting surface from the system of FIG. 1. This frequency signal may be applied to a suitable frequency measuring circuit 29 the output of which is fed to a suitable calibrated meter 32.

It will be apparent that the embodiment shown is only exemplary and that various modifications can be made in construction and arrangement within the scope of the invention as defined in the appended claims.

I claim as my invention:

1. A frequency-modulated, continuous-wave range tracking and distance measuring system comprising:
   (a) signal generator means for generating a variable frequency periodic waveform which varies randomly in amplitude,
   (b) a frequency modulated transmitter having the frequency of its output controlled by said signal generator means,
   (c) means connected to said frequency modulated transmitter for radiating electromagnetic energy,
   (d) means for receiving reflected electromagnetic energy,
   (e) a first mixer connected to said means for receiving reflected electromagnetic energy,
   (f) coupling means connected to said frequency modulated transmitter for coupling a portion of the output of said transmitter to said first mixer,
   (g) feedback means connected to said first mixer for controlling the output of said signal generator means so as to maintain the frequency of the output of said first mixer constant,
   (h) delay means for producing a fixed time delay of an electrical signal,
   (i) second coupling means connected to said frequency modulated transmitter for coupling a portion of the output of said transmitter to said delay means,
   (j) a second mixer having one input connected to the output of said second coupling means and a second input connected to the output of said delay means,
   (k) frequency measuring means connected to said second mixer for measuring the difference frequency of the output of said second mixer, and
   (l) display means connected to said frequency measuring means for displaying a distance which is proportional to the output of said frequency measuring means.

2. A frequency-modulated, continuous-wave range tracking and distance measuring system comprising:
   (a) a variable frequency periodic wave generation means,
   (b) means for randomly varying the amplitude of the output of said generation means,
   (c) frequency modulated transmitting means connected to said generation means for producing an output signal which varies in frequency in a manner directly proportional to the amplitude of the output of said generation means,
   (d) means connected to said transmitting means for radiating electromagnetic energy,
   (e) means for receiving reflected electromagnetic energy,
   (f) means connected to said transmitting means and to said means for receiving for comparing the frequencies of the transmitted and received signals and providing an output signal equal to the difference of the two signals,
   (g) feedback means connected to said means for comparing and to said generation means for controlling said generation means to maintain the output signal of said means for comparing constant, (h) delay means connected to said transmitting means for providing an output signal which is delayed in time from the transmitted signal, (i) comparing means connected to said transmitting means and to said delay means for providing an output signal which is equal to the difference of the transmitted signal and the delayed signal, and (j) means for measuring the output of said comparing means.

References Cited by the Examiner

UNITED STATES PATENTS

| | | | |
|---|---|---|---|
| 2,825,056 | 2/1958 | Rust | 343—14 |
| 2,839,734 | 6/1958 | Hanley | 343—17.2 |
| 2,929,057 | 3/1960 | Green | 343—14 |
| 3,065,465 | 11/1962 | Wimberly | 343/14 |

CHESTER L. JUSTUS, *Primary Examiner.*

R. E. KLEIN, *Assistant Examiner.*